(12) United States Patent
Zhou

(10) Patent No.: US 11,481,604 B2
(45) Date of Patent: Oct. 25, 2022

(54) APPARATUS AND METHOD FOR NEURAL NETWORK PROCESSING

(71) Applicant: ALIBABA GROUP HOLDING LIMITED, Grand Cayman (KY)

(72) Inventor: Qinggang Zhou, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 548 days.

(21) Appl. No.: 16/663,203

(22) Filed: Oct. 24, 2019

(65) Prior Publication Data

US 2021/0125033 A1 Apr. 29, 2021

(51) Int. Cl.
*G06N 3/04* (2006.01)
*G06F 5/01* (2006.01)
*G06N 3/08* (2006.01)

(52) U.S. Cl.
CPC ............ *G06N 3/0454* (2013.01); *G06F 5/01* (2013.01); *G06N 3/08* (2013.01)

(58) Field of Classification Search
CPC ........ G06N 3/084; G06N 3/0454; G06N 3/08; G06F 5/06
USPC ....................... 375/240.02; 706/10
See application file for complete search history.

(56) References Cited

U.S. PATENT DOCUMENTS

| | | | | |
|---|---|---|---|---|
| 11,354,564 B2* | 6/2022 | Heinecke | | G06F 8/4442 |
| 2019/0114547 A1* | 4/2019 | Jaganathan | | G06N 3/08 |
| 2019/0341052 A1* | 11/2019 | Allibhai | | G10L 25/90 |
| 2020/0097829 A1* | 3/2020 | Deng | | G06N 3/084 |
| 2020/0302286 A1* | 9/2020 | Nam | | G06N 3/0481 |
| 2021/0042260 A1* | 2/2021 | Reinhardt | | G06F 9/3001 |
| 2021/0158135 A1* | 5/2021 | Mills | | G06N 3/084 |

OTHER PUBLICATIONS

Jung, Wonkyung et al. "Restructuring Batch Normalization to Accelerate CNN Training", Proceedings of the 2$^{nd}$ SysML Conference, Palo Alto, CA, 2019, https://arxiv.org/pdf/1807.01702.pdf, 13 pages.
Ioffe, Sergey et al., "Batch Normalization: Accelerating Deep Network Training by Reducing Internal Covariate Shift", https://arxiv.org/pdf/1502.03167.pdf, 11 pages.

* cited by examiner

*Primary Examiner* — Emmanuel Bayard
(74) *Attorney, Agent, or Firm* — Finnegan, Henderson, Farabow, Garrett & Dunner, LLP

(57) ABSTRACT

The present disclosure relates to neural network processing apparatus and method. An exemplary neural network processing apparatus includes: a memory for storing data; an operation unit to perform an operation on a first batch of tensors; a statistics determination unit communicatively coupled to the operation unit and configured to receive an output from the operation unit and determine statistics from the output; and a normalization unit communicatively coupled to the memory and the statistics determination unit and configured to receive a second batch of tensors from the memory and the statistics from the statistics determination unit and to normalize the second batch of tensors using the statistics.

20 Claims, 15 Drawing Sheets

200

600

APPARATUS AND METHOD FOR NEURAL NETWORK PROCESSING

BACKGROUND

In machine learning (ML) or deep learning (DL), a neural network is a very powerful mechanism that basically mimics how a human brain learns. Typically, a neural network can be graphically represented by a computational graph including nodes and edges organized as a directed acyclic graph (DAG). Nodes represent variables or computation operations, while edges represent data or tensor flowing from one node to another. A node of a variable can feed its value into a node of a computation operation, and a node of a computation operation can feed its output into other nodes of computation operations. An incoming edge to a node of a computation operation is input data consumed by the computation operation, while an outgoing edge from the node represents output data produced by the computation operation. Therefore, every node in the computational graph defines a function of variables. In DL, the computational graph can describe data flow dependencies between computation operations in the neural network.

A typical ML or DL model may have thousands or even millions of nodes and is usually very large (hundreds of Mbytes). Therefore, improving computational performance of the ML or DL model potentially creates many challenges.

SUMMARY

Embodiments of the present disclosure relates to neural network processing apparatus and method. In some embodiments, an exemplary neural network processing apparatus includes: a memory for storing data; an operation unit to perform an operation on a first batch of tensors; a statistics determination unit communicatively coupled to the operation unit and configured to receive an output from the operation unit and determine statistics from the output; and a normalization unit communicatively coupled to the memory and the statistics determination unit and configured to receive a second batch of tensors from the memory and the statistics from the statistics determination unit and to normalize the second batch of tensors using the statistics.

In some embodiments, an exemplary neural network processing method includes: performing an operation on a first batch of tensors; determining statistics from a result of the operation; receiving a second batch of tensors from a memory; and normalizing the second batch of tensors using the statistics.

In some embodiments, an exemplary terminal includes a host unit and one or more heterogeneous computation units (HCUs) communicatively coupled with the host unit. Each HCU includes a memory for storing data; an operation unit to perform an operation on a first batch of tensors; a statistics determination unit communicatively coupled to the operation unit and configured to receive an output from the operation unit and determine statistics from the output; and a normalization unit communicatively coupled to the memory and the statistics determination unit and configured to receive a second batch of tensors from the memory and the statistics from the statistics determination unit and to normalize the second batch of tensors using the statistics.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
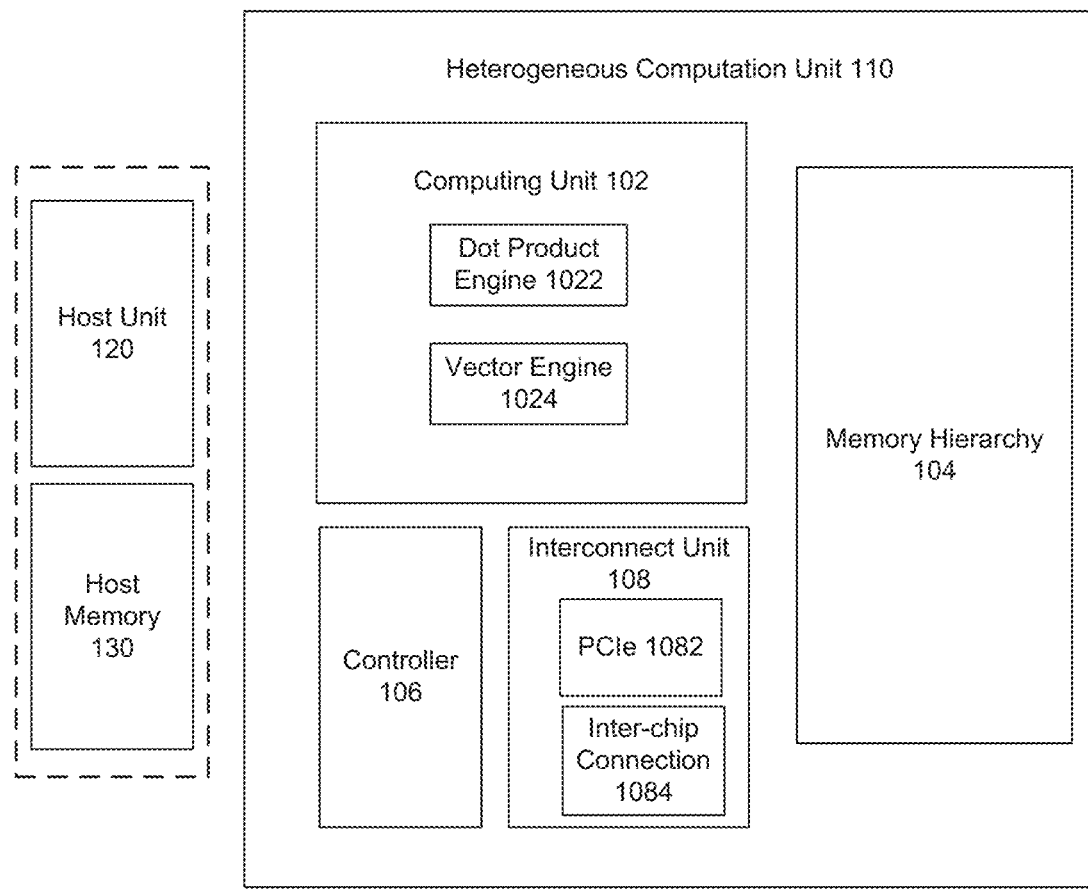
FIG. 1A illustrates an exemplary neural network processing architecture, according to some embodiments of the disclosure.

FIG. 1A illustrates an exemplary neural network processing architecture 100, according to some embodiments of the disclosure. As shown in FIG. 1A, architecture 100 can include a heterogeneous computation unit (HCU) 110 and a corresponding host unit 120 and host memory 130, and the like. It is appreciated that, HCU 110 can be a special-purpose computing device for facilitating neural network computing tasks. For example, HCU 110 can perform algorithmic operations (e.g., machine learning operations) based on communicated data. HCU 110 can be an accelerator, such as a Neural network Processing Unit (NPU), a Graphics Processing Unit (GPU), a Tensor Processing Unit (TPU), a Central Processing Unit (CPU), an Application Specific Integrated Circuit (ASIC), a Field Programmable Gate Array (FPGA), or the like.

HCU 110 can include one or more computing units 102, a memory hierarchy 104, a controller 106 and an interconnect unit 108. Each computing unit 102 can read data from and write data into memory hierarchy 104, and perform algorithmic operations (e.g., multiplication, addition, multiply-accumulate, etc.) on the data. In some embodiments, computing unit 102 can include a plurality of engines for performing different operations. For example, as shown in FIG. 1A, computing unit 102 can include a dot product engine 1022, a vector engine 1024, and the like. Dot product engine 1022 can perform dot product operations such as multiplication and convolution. Vector engine 1024 can perform vector operations such as addition.

Memory hierarchy 104 can have on-chip memory blocks (e.g., 4 blocks of 8 GB second generation of high bandwidth memory (HBM2)) to serve as main memory. Memory hierarchy 104 can store data and instructions, and provide other components, such as computing unit 102 and interconnect 108, with high speed access, to the stored data and instructions.

Interconnect unit 108 can communicate data between HCU 110 and other external components, such as host unit or another HCU. Interconnect unit 108 can include a peripheral component interconnect express (PCIe) interface 1082 and an inter-chip connection 1084. PCIe interface 1082 provides communication between HCU and host unit 120 or EtherNet. Inter-chip connection 1084 servers as an inter-chip bus, connecting the HCU with other devices, such as other HCUs, the off-chip memory or peripherals.

Controller 106 can control and coordinate the operations of other components such as computing unit 102, interconnect unit 108 and memory hierarchy 104. For example, controller 106 can control dot product engine 1022 or vector engine 1024 in computing unit 102 and interconnect unit 108 to facilitate the parallelization among these components.

Host memory 130 can be off-chip memory such as a host CPU's memory. For example, host memory 130 can be a DDR memory (e.g., DDR SDRAM) or the like. Host memory 130 can be configured to store a large amount of data with slower access speed, compared to the on-chip memory integrated within one or more processors, acting as a higher-level cache.

Host unit 120 can be one or more processing units (e.g., an X86 central processing unit (CPU)). In some embodiments, a host system having host unit 120 and host memory 130 can include a compiler (not shown). The compiler is a program or computer software that transforms computer codes written in one programming language into instructions for HCU 110 to create an executable program. In machine learning applications, a compiler can perform a variety of operations, for example, pre-processing, lexical analysis, parsing, semantic analysis, conversion of input programs to an intermediate representation, code optimization, and code generation, or combinations thereof.

Figure 1B:
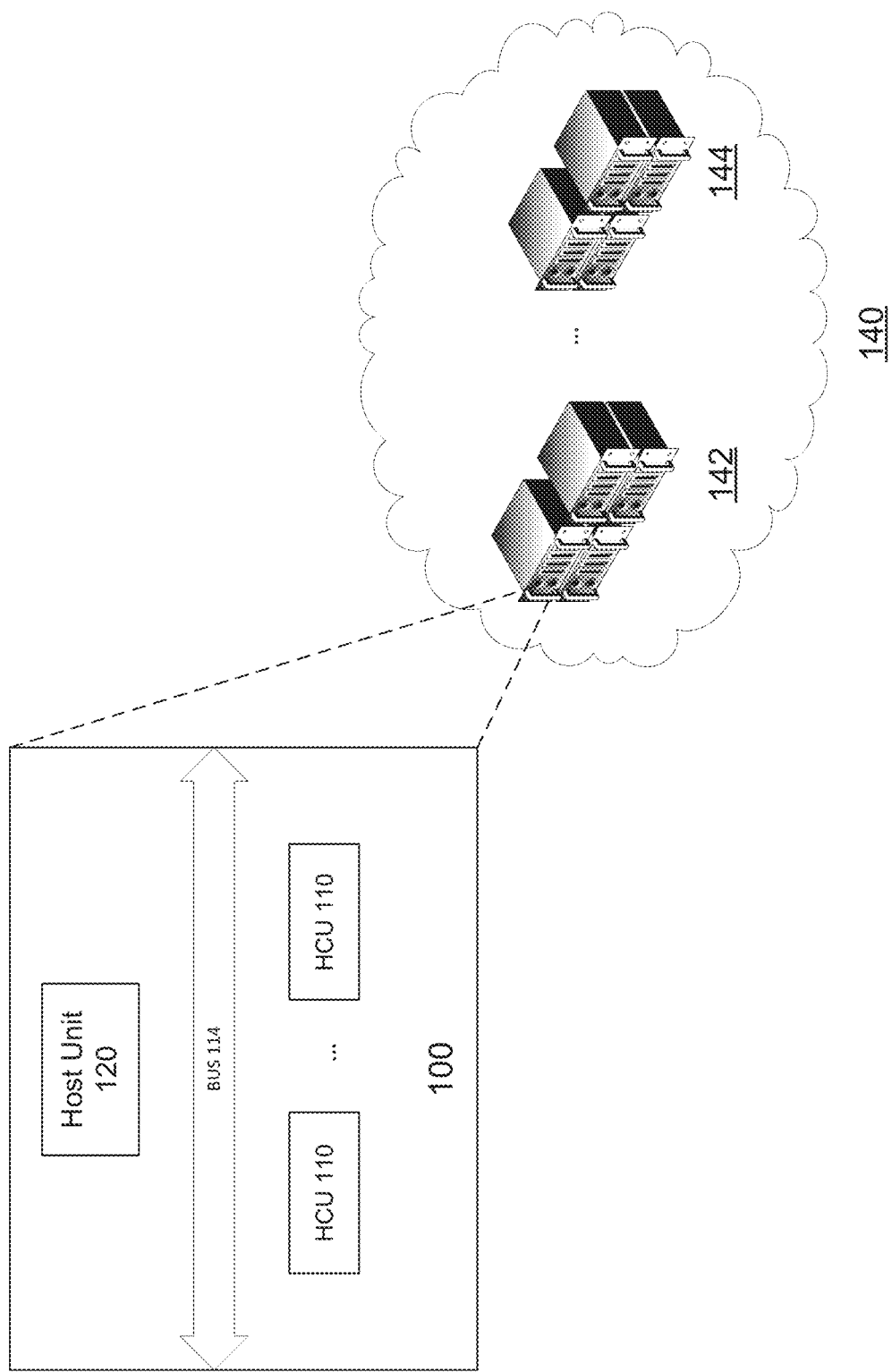
FIG. 1B illustrates a schematic diagram of an exemplary cloud system incorporating a neural network processing architecture, according to some embodiments of the disclosure.

FIG. 1B illustrates a schematic diagram of an exemplary cloud system 140 incorporating neural network processing architecture 100, according to some embodiments of the disclosure.

As shown in FIG. 1B, cloud system 140 can provide cloud service with artificial intelligence (AI) capabilities, and can include a plurality of computing servers (e.g., 142 and 144). In some embodiments, a computing server 142 can, for example, incorporate neural network processing architecture 100 of FIG. 1A. Neural network processing architecture 100 is shown in FIG. 1B in a simplified manner for simplicity and clarity.

With the assistance of neural network processing architecture 100, cloud system 140 can provide the extended AI capabilities of image recognition, facial recognition, translations, 3D modeling, and the like.

It is appreciated that, neural network processing architecture 100 can be deployed to computing devices in other forms. For example, neural network processing architecture 100 can also be integrated in a computing device, such as a smart phone, a tablet, and a wearable device.

Moreover, while a specific architecture is shown in FIGS. 1A-1B, it is appreciated that any HCU or any accelerator that provides the ability to perform parallel computation can be used.

Generally, a neural network can use training samples and labels to learn how to map specific sets of input data to output data. The input data includes observations or samples from a domain that describe conditions. The output data captures what the neural network thinks the observation means. The label for the input data captures what the observation is expected.

A typical neural network can comprise a plurality of layers of neurons (or nodes), including an input layer, an output layer and many hidden layers therebetween. Forward propagation (FP) refers to a forward computational process of a neural network. It starts with a first layer (or input layer) of neurons taking samples as inputs and calculating outputs of this layer. Then, a next layer (e.g., a hidden layer) takes these outputs as its inputs and calculates their own outputs. By repeating this layer by layer until the output layer, the neural network computes the outputs of the whole network.

Backpropagation (BP) is a backward computational process of training a neural network. It calculates gradients from losses for weight updates to be used. It starts from the last layer (or the output layer) by calculating losses and derivatives (or gradients) of the loss functions; and then propagates layer by layer to calculating losses for each layer and their gradients.

Typically, a neural network can be graphically represented by a computational graph. The computational graph includes nodes and edges organized as a directed acyclic graph (DAG). A node in the computational graph can be a node of variable or a node of computation operation. In some embodiments, a computational graph can be implemented by the neural network processing architecture 100 in FIG. 1A or cloud system 140 in FIG. 1B.

Figure 2:
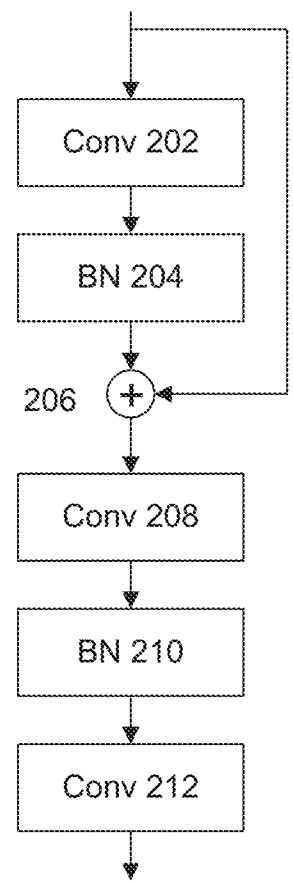
FIG. 2 illustrates an exemplary computational graph of a neural network, according to some embodiments of the disclosure.

FIG. 2 illustrates an exemplary high-level computational graph 200 of a neural network, according to some embodiments of the disclosure. As shown in FIG. 2, the computational graph 200 can include, from top to bottom, a first convolution layer (indicated by "Conv" in FIG. 2) 202, a first batch normalization (BN) layer 204, an elementwise operation layer 206 (e.g., an addition layer as shown), a second convolution layer 208, a second BN layer 210, and a third convolution layer 212. It is appreciated that a computational graph can include more or less layers that can perform operations the same as or different from those shown in FIG. 2 and that each layer can include a corresponding number of nodes and edges. In addition, the sequence of and dependencies among operation layers in a computational graph are not limited.

A convolution layer, e.g., first convolution layer 202, second convolution layer 208, and third convolution layer 212 in FIG. 2, within a neural network can include a number of convolution kernels. A convolution kernel can have a width, a height and a depth. Width and height of the convolution kernel are hyper-parameters. Input to the convolution layer can be a tensor with a shape (number of images)×(image width)×(image height)×(image depth). Depth of the convolution kernel can be equal to the image depth. In operation, convolution layer applies a convolution operation to the input and obtains a result as an output that can be passed to a next layer.

In some embodiments, a convolution layer can include a plurality of dot-product operations. For example, in the case where embodied in Application Specific Integrated Circuit (ASIC), a convolution layer can be implemented as a plurality of dot-products of tensors.

A BN layer, e.g., first BN layer 204 and second BN layer 210, within a neural network can perform a batch normalize on an input (e.g., a batch of tensors) that is output from a previous layer. For example, a BN layer can receive the input that includes a full batch of tensor, determine statistics from the batch of tensor, and perform normalization by modifying a plurality of elements in the batch. The statistics can include a means and a variance or a standard deviation. The BN layer can perform the batch normalization according to following equations:

Input: values of $x$ over a batch: $B = \{x_{1...m}\}$;

Output $\{y_i = BN_{\gamma,\beta}(x_i)\}$ $$\mu_B \leftarrow \frac{1}{m}\sum_{i=1}^{m} x_i$$

$$\sigma_B^2 \leftarrow \frac{1}{m}\sum_{i=1}^{m} (x_i - \mu_B)^2$$

$$\hat{x}_i \leftarrow \frac{x_i - \mu_B}{\sqrt{\sigma_B^2 + \epsilon}}$$

$$y_i \leftarrow \gamma \hat{x}_i + \beta \equiv BN_{\gamma,\beta}(x_i)$$

where $\gamma$ and $\beta$ represent scale and bias, respectively, which are to be learned, $\mu_B$ represents a batch mean, $\sigma_B^2$ represents a batch variance, and E is a constant. Based on $\mu_B$ and $\sigma_B^2$, normalization is performed to produce $\hat{x}_i$. Then, $\hat{x}_i$ is transformed (e.g., scaled and shifted) to produce $y_i$.

In some embodiments, batch normalization can improve the speed, performance, and stability of a neural networks.

An element-wise layer, e.g., element-wise operation layer 206 in FIG. 2, within a neural network can perform an operation on each element of a tensor in an elementwise manner. For example, the element-wise operation layer can be an addition layer that adds two tensors by adding corresponding elements in the two tensors.

Figure 3:
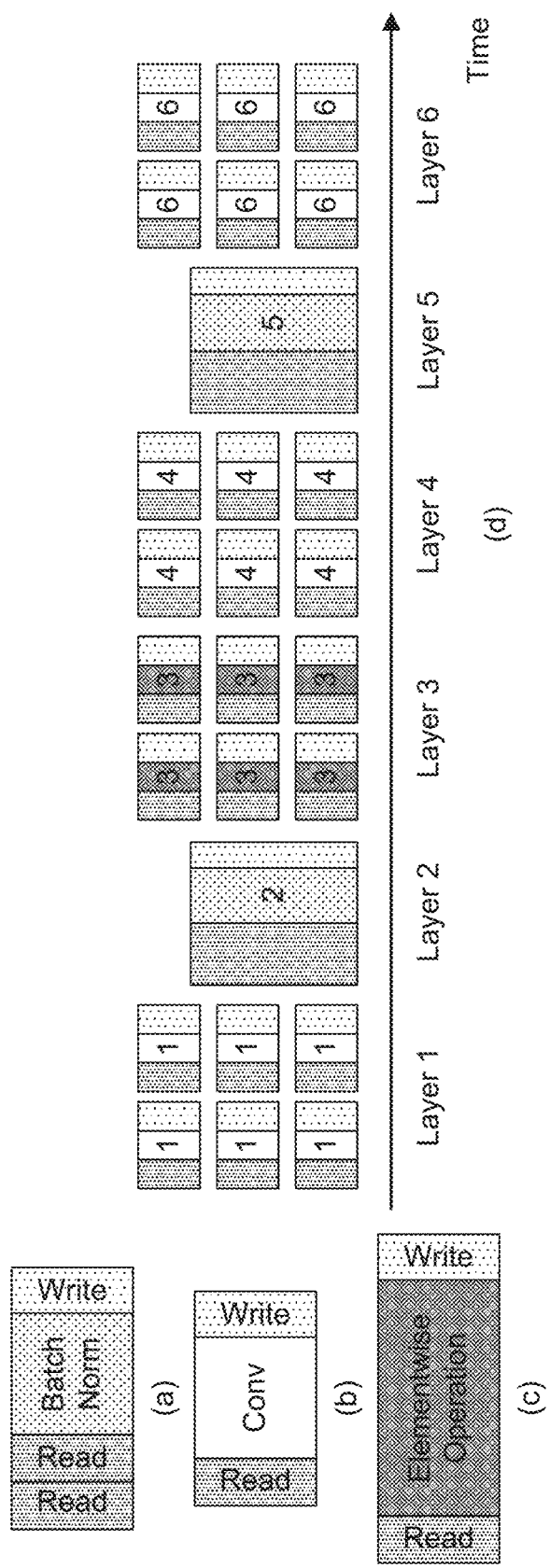
FIG. 3 illustrates a schematic diagram of a first exemplary sequence of workloads, according to some embodiments of the disclosure.

Generally, a typical neural network processing system may implement a computational graph with its native order as the computational graph specifies. For example, FIG. 3 illustrates a schematic diagram of an exemplary sequence of workloads, according to some embodiments of the disclosure, where a typical neural network processing system trains the computational graph in FIG. 2. A batch for the training has a size of 6 samples (e.g., tensors).

As shown in FIG. 3, each box represents a task that may include a plurality of steps each indicated by a block. For example, box (a) represents a task for a BN layer, which involves reading an input (e.g., from a memory), performing a BN operation, and then writing an output back to the memory. Similarly, box (b) represents a task for a convolution layer, which involves reading an input, performing a convolution operation, and writing an output. In some embodiments, a convolution layer can include a plurality of dot-product operations. Box (c) represents a task for an element-wise operation layer, which involves reading an input, performing an elementwise operation, and writing an output. It is appreciated that in FIG. 3, as well as FIG. 5 and FIGS. 7-11, blocks with a same pattern represent a same operation, such as read, write, BN, convolution, element-wise operation, and the like. In addition, numerals in boxes or blocks represent which layer the tasks or operations belong to.

As shown in FIG. 3, at right part (d), the first layer, Layer 1, is a convolution layer, e.g., convolution layer 202 of the computational graph in FIG. 2. Layer 1 can complete a full batch of six samples (e.g., tensors). Therefore, in Layer 1, a total of six convolution tasks are performed. Each task reads a sample (e.g., a tensor) and writes back a determined output tensor.

The second layer, Layer 2, is a BN layer, e.g., BN layer 204 of the computational graph in FIG. 2. Layer 2 can read the determined six output tensors of Layer 1, determine statistics, and perform a normalization. Conventionally, Layer 2 requires reading twice the full batch of tensors output from Layer 1, and writing back six output tensors.

The third layer, Layer 3, is an elementwise operation layer, e.g., elementwise operation layer 206 of the computational graph in FIG. 2. For example, Layer 3 can be an addition layer. Layer 3 includes six independent tasks, each of which reads and processes one tensor.

The fourth layer, Layer 4, and the sixth layer, Layer 6, are also convolution layers, e.g., convolution layers 208 and 212 of the computational graph in FIG. 2. Each of convolution Layers 4 and 6 includes six convolution tasks, similarly to Layer 1 discussed above.

The fifth layer, Layer 5, is another BN layer, e.g., BN layer 210 of the computational graph in FIG. 2. Layer 5 can perform a BN task similar to that of Layer 2.

For an existing conventional neural network processing system, there may be some drawbacks. For example, the task of each operation layer includes reading its input from a batch memory (e.g., main memory) and writing its output back to batch memory. Generally, the batch memory can provide relatively low-speed access to data and instructions stored therein. Therefore, many times of reading data from and writing data back to batch memory can collectively increase the training time. As another example, the task of BN layer works on a full batch of data (e.g., a full batch of tensors), which prevents a task before it from being merged with a task after it.

Figure 4:
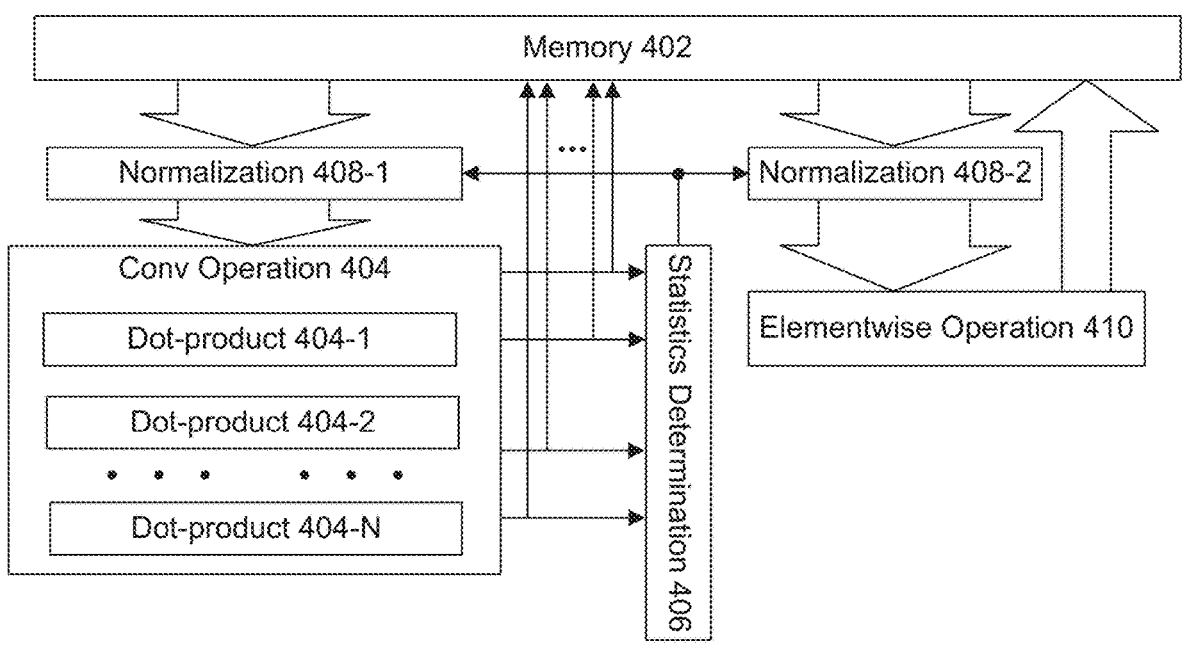
FIG. 4 illustrates a schematic diagram of a first exemplary neural network processing apparatus, according to some embodiments of the disclosure.

FIG. 4 illustrates a schematic diagram of an exemplary neural network processing apparatus 400, according to some embodiments of the disclosure. In some embodiments, neural network processing apparatus 400 can be embodied in neural network processing architecture 100 in FIG. 1A or cloud system 140 in FIG. 1B.

As shown in FIG. 4, neural network processing apparatus 400 can include a memory 402, a convolution operation unit 404, a statistics determination unit 406, a normalization unit 408 (including normalization units 408-1 and 408-2, collectively referred to as normalization unit 408), and an elementwise operation unit 410. Memory 402 can store batch data (e.g., bathes of tensors) and instructions. For example, memory 402 can have on-chip and off-chip memory blocks to serve as main memory. Memory 402 can provide access to instruction and data to other components, such as convolution operation unit 404, normalization unit 408, and an elementwise operation unit 410. In some embodiments, memory 402 can be implemented as memory hierarchy 104 in FIG. 1.

Convolution operation unit 404 can perform convolution on input data (e.g., a batch of input tensors). For example, convolution operation unit 404 can include a plurality of dot-product operation elements 404-1, 404-2, . . . , 404-N, as shown in FIG. 4. It is appreciated that, convolution operation unit 404 in FIG. 4 is shown merely as an example, other types of operation units that perform different operations can also be used in the neural network processing apparatus 400.

Statistics determination unit 406 can be communicatively coupled to convolution operation unit 404. Then, statistics determination unit 406 receives output data (e.g., a batch of tensors) from convolution operation unit 404 as its input. For example, statistics determination unit 406 receives a batch of tensors output from the plurality of dot-product operation elements 404-1, 404-2, . . . , 404-N. Statistics determination unit 406 determines statistics from the received data. For example, statistics determination unit 406 can determines a means and a variance or a standard deviation from the batch of tensors output from convolution operation unit 404.

Normalization unit 408 can include one or more normalization units. As shown in FIG. 4, normalization unit 408-1 can be communicatively coupled to statistics determination unit 406, memory 402 and convolution operation unit 404. Normalization unit 408-1 can receive statistics output from statistics determination unit 406, read data (e.g., a batch of tensors) from memory 402, and normalize the data using the statistics. For example, normalization unit 408-1 can normalize a batch of tensors read from memory 402 using a means and a variance received from statistics determination unit 406. In addition, normalization unit 408-1 can also transform (e.g., scale and shift) the normalized data using a scale and a bias.

In some embodiments, normalization unit 408 can be merged with an activation function unit (not shown), and perform an activation function. Activation function includes Binary Step function, Linear function, Sigmoid function, Tanh function, ReLU function, Leaky ReLU function, Softmax function, and the like. For example, normalization unit 408 can also perform a ReLu function.

The output of normalization unit 408-1 can be passed to convolution operation unit 404 for further processing.

Similar to normalization unit 408-1, another normalization unit 408-2 can be communicatively coupled to statistics determination unit 406, memory 402 and elementwise operation unit 410. Normalization unit 408-2 can receive statistics (e.g., a means and a variance or standard variance) output from statistics determination unit 406, read data (e.g., a batch of tensors) from memory 402, and normalize the data using the received statistics. In addition, normalization unit 408-2 can also transform (e.g., scale and shift) the normalized data using a scale and a bias. In some embodiments, normalization unit 408-2 can also perform a ReLu function.

The output of normalization unit 408-2 can be passed to elementwise operation unit 410 for further processing. Elementwise operation unit 410 can perform an elementwise operation, such as addition, on data received from normalization unit 408-2, and write output back to memory 402. While FIG. 4 illustrates unit 410 as an elementwise operation unit, it is appreciated that elementwise operation unit is merely an example, and any other type of operation units can be implemented in the neural network processing apparatus 400.

As shown in FIG. 4, a BN layer can be divided into two parts, including statistic determination and data normalization, and thus implemented by two units, including statistic determination unit 406 and normalization unit 408. Normalization unit 408 can also perform a transformation by operations of scaling and shifting. In addition, data normalization can further be combined with an activation function (e.g., ReLU) into one unit, normalization unit 408, and moved to the front of processing pipeline.

Figure 5:
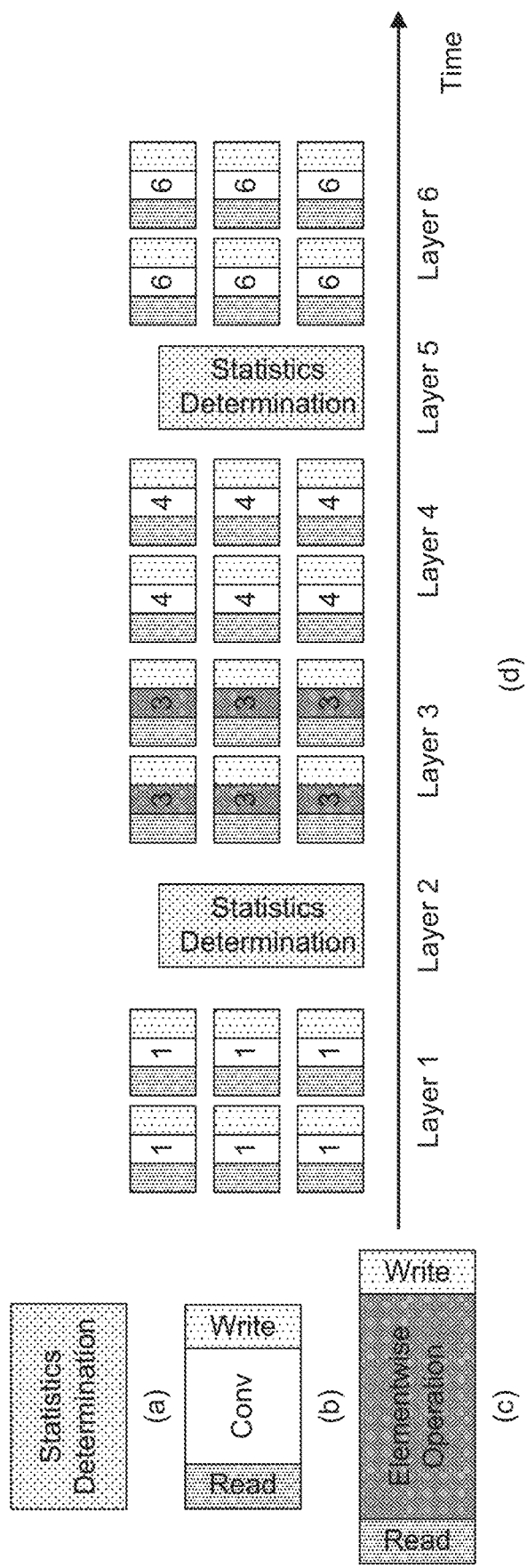
FIG. 5 illustrates a schematic diagram of a second exemplary sequence of workloads, according to some embodiments of the disclosure.

FIG. 5 illustrates a schematic diagram of an exemplary sequence of workloads where neural network processing apparatus 400 in FIG. 4 performs computational graph 200 in FIG. 2, according to some embodiments of the disclosure. Boxes or blocks in FIG. 5 represent similar tasks or operations to those of FIG. 3, as shown in parts (a)-(c) of FIG. 5. Since combined with activation function and moved to the front of processing pipeline, data normalization is merged with a task of each operation unit and included into tasks in other layers. Compared with the sequence of workloads in FIG. 3, as shown at part (d) of FIG. 5, task boxes of Layer 2 and Layer 5 represent statistics determination and do not include reading and writing blocks, as shown in FIG. 5. Therefore, the reading and writing operations in a BN layer as shown in FIG. 3 are not utilized in FIG. 5, thereby speeding up processing and saving memory space.

Figure 6:
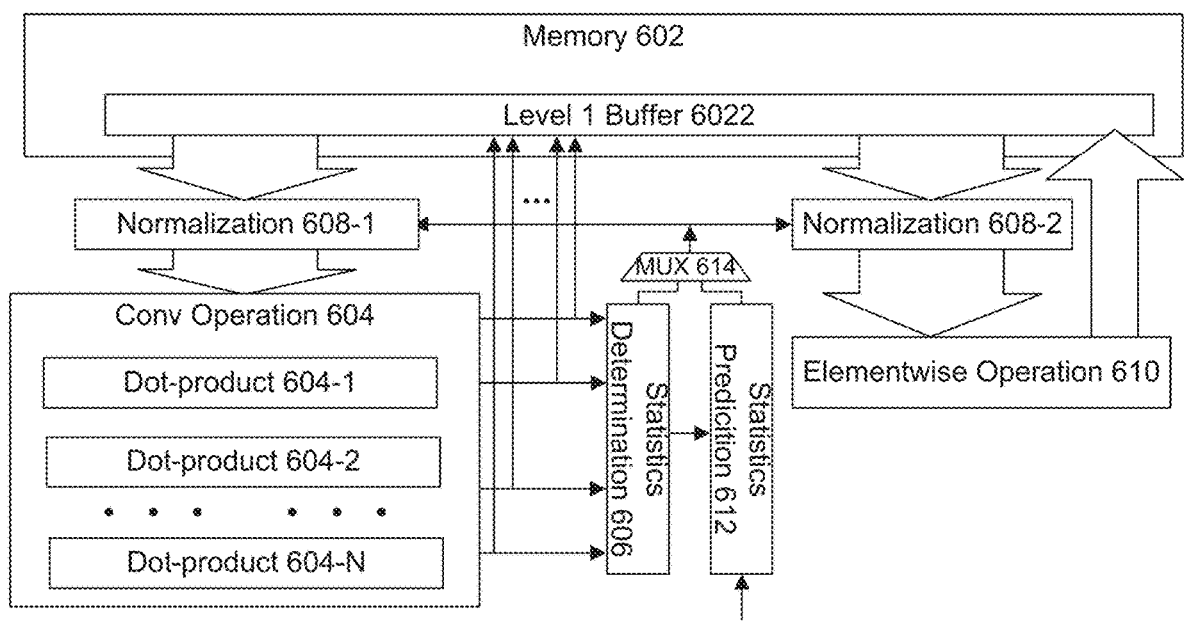
FIG. 6 illustrates a schematic diagram of a second exemplary neural network processing apparatus, according to some embodiments of the disclosure.

FIG. 6 illustrates a schematic diagram of another exemplary neural network processing apparatus 600, according to some embodiments of the disclosure. In some embodiments, neural network processing apparatus 600 can be embodied in neural network processing architecture 100 in FIG. 1A or cloud system 140 in FIG. 1B.

As shown in FIG. 6, neural network processing apparatus 600 can include a memory 602, a convolution operation unit 604, a statistics determination unit 606, a normalization unit 608 (including normalization units 608-1 and 608-2, collectively referred to as normalization unit 608), an elementwise operation unit 610, and a statistics prediction unit 612.

Memory 602 can store batch data (e.g., batches of tensors) and instructions. For example, memory 402 can have on-chip and off-chip memory blocks to serve as main memory. For example, memory 402 can be implemented as memory hierarchy 104 in FIG. 1. In some embodiment, memory 602 can be a buffer hierarchy. As shown in FIG. 6, memory 602 can include a Level 1 buffer 6022, which can provide high-speed access to data and instructions stored therein to other components. For example, Level 1 buffer 6022 can be communicatively coupled to convolution operation unit 604, normalization unit 608, and elementwise operation unit 610, and temporarily buffer input or output data for these operation units. Therefore, these operation units do not need to read data from or write data to a main memory, which provides a relatively low-speed access to data and instructions stored therein.

Convolution operation unit 604 can perform convolution on input data (e.g., a batch of input tensors). For example, as shown in FIG. 6, convolution operation unit 604 can include a plurality of dot-product operation elements 604-1, 604-2, . . . , 604-N. Convolution operation unit 604 can be communicatively coupled to Level 1 buffer 6022. Therefore, after operation, convolution operation unit 604 can buffer its result of convolution in Level 1 buffer 6022. It is appreciated that, convolution operation unit 604 in FIG. 6 is shown merely as an example, other types of operation units which perform different operations can also be used in the neural network processing apparatus 600.

Statistics determination unit 606 can be communicatively coupled to convolution operation unit 604. Then, statistics determination unit 606 receives output data (e.g., a batch of tensors) from convolution operation unit 604 as its input. For example, statistics determination unit 606 receives a batch of tensors output from the plurality of dot-product operation elements 604-1, 604-2, . . . , 604-N. Statistics determination unit 606 determines statistics from the received data. For example, statistics determination unit 606 can determines a means and a variance or a standard deviation from the batch of tensors output from convolution operation unit 604.

Statistics prediction unit 612 can predict statistics based on previous data. For example, statistics prediction unit 612 can predict a mean and a variance or a standard deviation based on tensors from previous batches, which is different from statistics determination unit 606 that determines statistics based on tensors in current batch output from convolution operation unit 604. As an input, statistics prediction unit 612 can receive previous data, e.g., a last batch of tensors, result of a data preprocessing, and the like.

Neural network processing apparatus 600 can also include a multiplexer (indicated by "MUX" in FIG. 6) 614. Multiplexer 614 can be communicatively coupled to statistics determination unit 606 and statistics prediction unit 612 and multiplex the outputs from these two units. Output of multiplexer 614 can be communicatively coupled to normalization unit 608.

Normalization unit 608 can include one or more normalization units. As shown in FIG. 6, normalization unit 608-1 can be communicatively coupled to multiplexer 614, Level 1 buffer 6022 and convolution operation unit 604. Normalization unit 608-1 can receive statistics output from multiplexer 614 and data (e.g., a batch of tensors) from Level 1 buffer 6022, and normalize the data using the statistics. For example, normalization unit 608-1 can normalize a batch of tensors from Level 1 buffer 6022 using a means and a variance received from multiplexer 614. In addition, normalization unit 608-1 can also transform (e.g., scale and shift) the normalized data using a scale and a bias.

In some embodiments, normalization unit 608 can be merged with an activation function unit (not shown), and perform an activation function. For example, normalization unit 608 can also perform a ReLu function.

The output of normalization unit 608-1 can be passed to convolution operation unit 604 for further processing.

Similar to normalization unit 608-1, another normalization unit 608-2 can be communicatively coupled to multiplexer 614, Level 1buffer 6022 and elementwise operation unit 410. Normalization unit 608-2 can receive statistics (e.g., a means and a variance or standard variance) output from multiplexer 614 and data (e.g., a batch of tensors) from Level 1 buffer 6022, and normalize the received data using the statistics. In addition, normalization unit 608-2 can also transform (e.g., scale and shift) the normalized data using a scale and a bias.

The output of normalization unit 608-2 can be passed to elementwise operation unit 610 for further processing. Elementwise operation unit 610 can perform a type of elementwise operation, such as addition, on received data from normalization unit 608-2, and buffer output in Level 1 buffer 6022. While FIG. 6 illustrates unit 610 as an elementwise operation unit, it is appreciated that elementwise operation unit is merely an example, and any other type of operation units can be implemented in the neural network processing apparatus 600.

As shown in FIG. 6, statistics can be determined by determination unit 606 or predicted by prediction unit 612. As a result of statistics prediction, BN task may not block task scheduling. Tasks originating from a same input, e.g., a tensor from a batch, may be merged together and read/write may be saved. In addition, memory footprint for each task can be reduced. Therefore, neural network processing apparatus 600 does not require a big buffer to temporarily store intermedia data between tasks.

Figure 7:
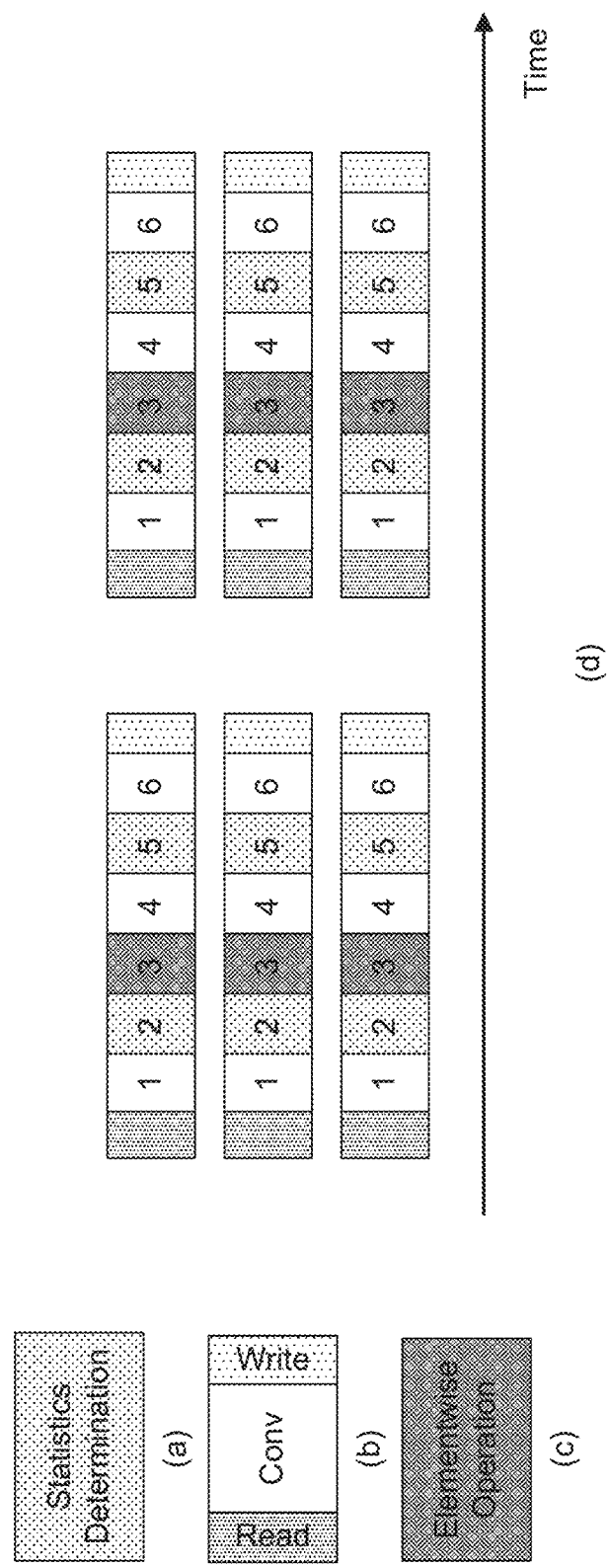
FIG. 7 illustrates a schematic diagram of a third exemplary sequence of workloads, according to some embodiments of the disclosure.

FIG. 7 illustrates a schematic diagram of an exemplary sequence of workloads where neural network processing apparatus 600 in FIG. 6 performs computational graph 200 in FIG. 2, according to some embodiments of the disclosure. Boxes or blocks in FIG. 7 represent similar tasks or operations to those of FIG. 3 and FIG. 5, as shown in parts (a)-(c) of FIG. 7. Since BN layer can use statistics prediction and may not block task scheduling, as shown at part (d) of FIG. 7, tasks 1-6 originating from a same tensor from an input batch can be merged together, thereby minimizing the number of time-consuming read and write operations across a computational graph. For a batch of six tensors, there are six independent sequences of workloads, each including only one read block and one write block for each sequence.

Figure 8:
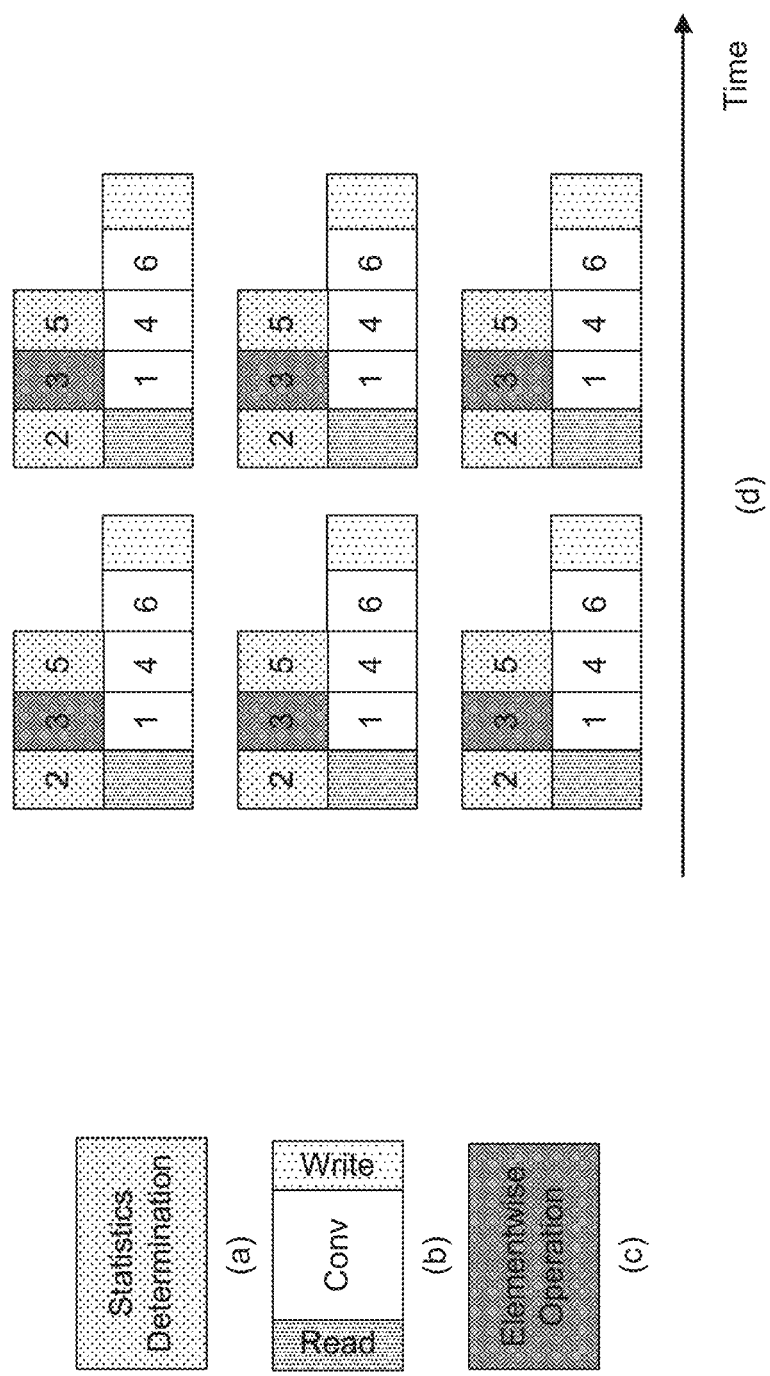
FIG. 8 illustrates a schematic diagram of a fourth exemplary sequence of workloads, according to some embodiments of the disclosure.

FIG. 8 illustrates a schematic diagram of another exemplary sequence of workloads where neural network processing apparatus 600 in FIG. 6 performs computational graph 200 in FIG. 2, according to some embodiments of the disclosure. Boxes or blocks in FIG. 8 represent similar tasks or operations to those of FIG. 3, FIG. 5 and FIG. 7, as shown in parts (a)-(c) of FIG. 8. Different from FIG. 7 where tasks 1-6 are sequentially performed, part (d) of FIG. 8 illustrates six independent sequences of workloads where tasks 2, 3 and 5 can run in parallel with tasks 1, 4 and 6. Each sequence of workloads can include only one read block an one write block, as opposed to conventional systems providing a read block and a write block for each task.

Figure 9:
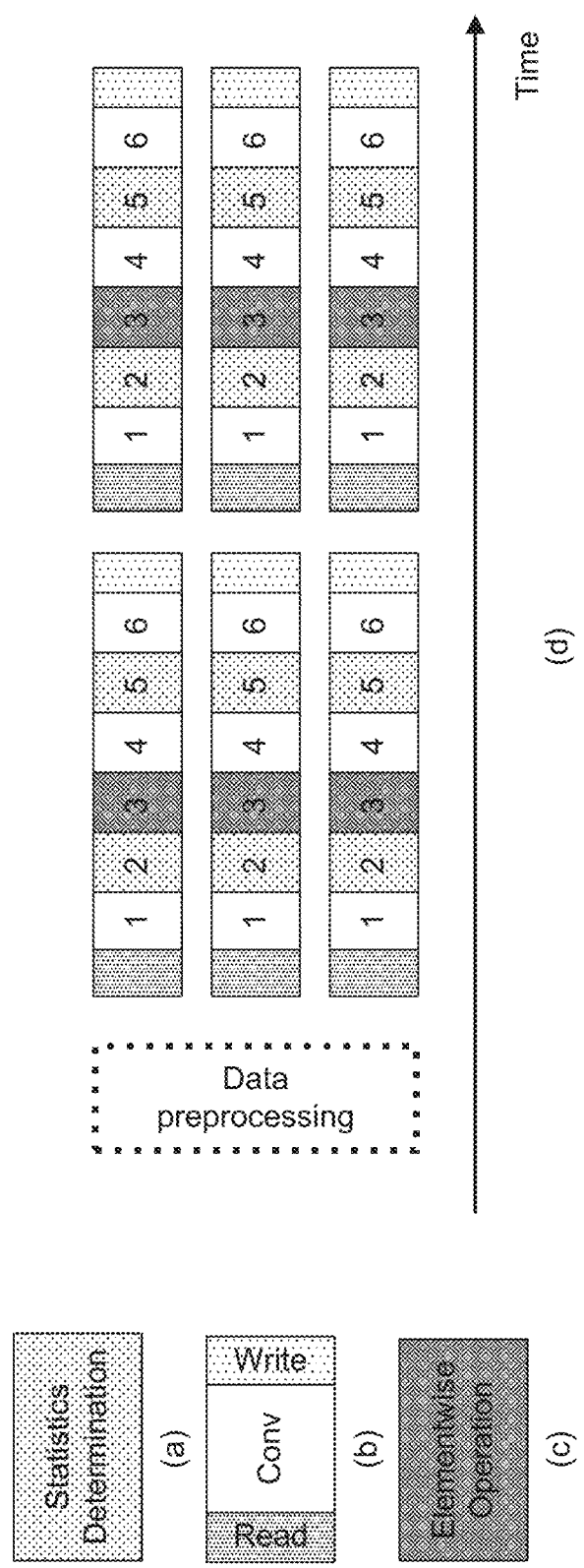
FIG. 9 illustrates a schematic diagram of a fifth exemplary sequence of workloads with data preprocessing, according to some embodiments of the disclosure.

FIG. 9 illustrates a schematic diagram of an exemplary sequence of workloads with data preprocessing, where neural network processing apparatus 600 in FIG. 6 performs computational graph 200 in FIG. 2, according to some embodiments of the disclosure. Boxes or blocks in FIG. 9 represent similar tasks or operations to those of FIG. 3, FIG. 5, FIG. 7, and FIG. 8, as shown in parts (a)-(c) of FIG. 9. In some embodiments, a processing unit (not shown) internal or external to neural network processing apparatus 600 in FIG. 6 can preprocess data for statistics prediction unit 612 or configure statistics prediction unit 612. For example, the processing unit can be implemented by host unit 120 (e.g., a CPU) in FIGS. 1A-1B. As shown at part (d) of FIG. 9, data preprocessing can be performed by the processing unit before tasks of the workloads. Tasks of each sequence of workloads can run sequentially and independent from other sequences of workloads.

Figure 10:
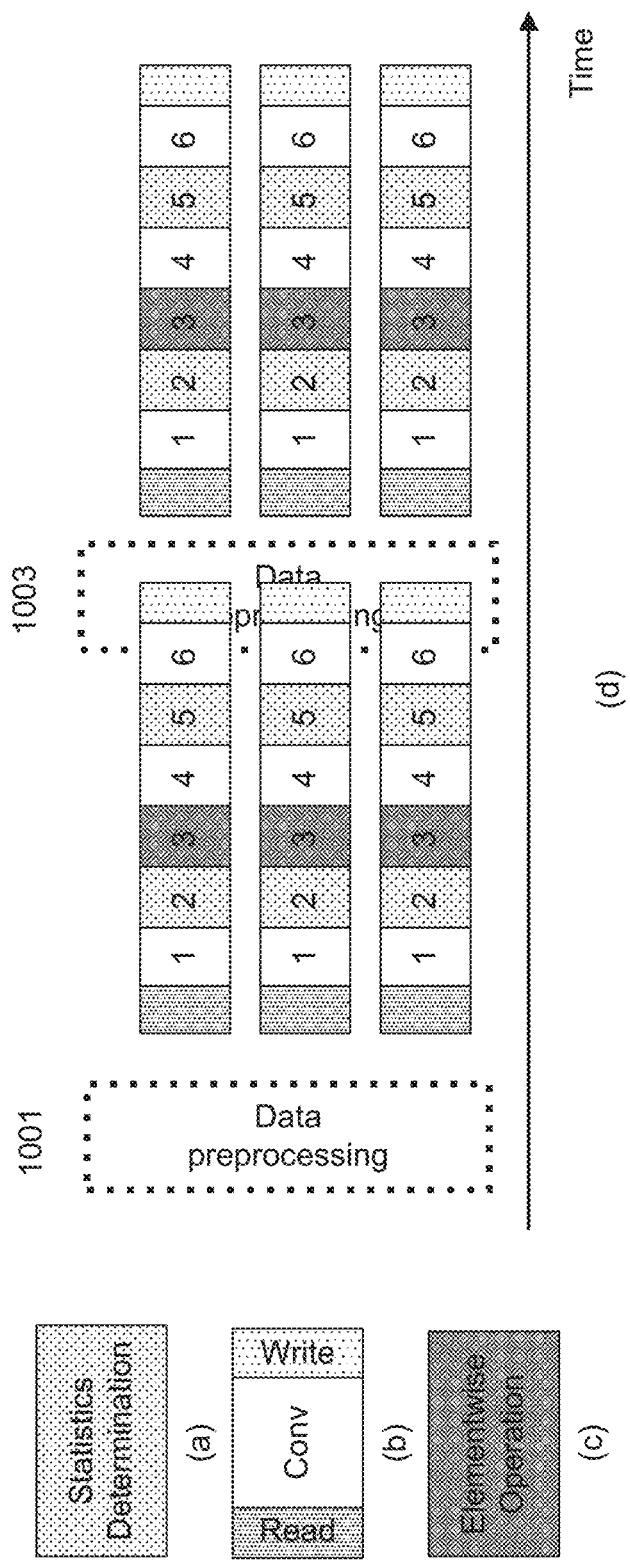
FIG. 10 illustrates a schematic diagram of a sixth exemplary sequence of workloads with data preprocessing, according to some embodiments of the disclosure.

FIG. 10 illustrates a schematic diagram of another exemplary sequence of workloads with data preprocessings 1001 and 1003, where neural network processing apparatus 600 in FIG. 6 performs computational graph 200 in FIG. 2, according to some embodiments of the disclosure. Boxes or blocks in FIG. 10 represent similar tasks or operations to those of FIG. 3, FIG. 5, and FIGS. 7-9, as shown in parts (a)-(c) of FIG. 10. As shown at part (d) of FIG. 10, data preprocessing 1003 may be performed during the computation graph 200 and in parallel with tasks in left column of sequences of workloads. The data preprocessings 1001 and 1003 can be scheduled before configuring statistics prediction unit. Similar to FIG. 9, tasks of each sequence of workloads can run sequentially and independent from other sequences of workloads.

Figure 11:
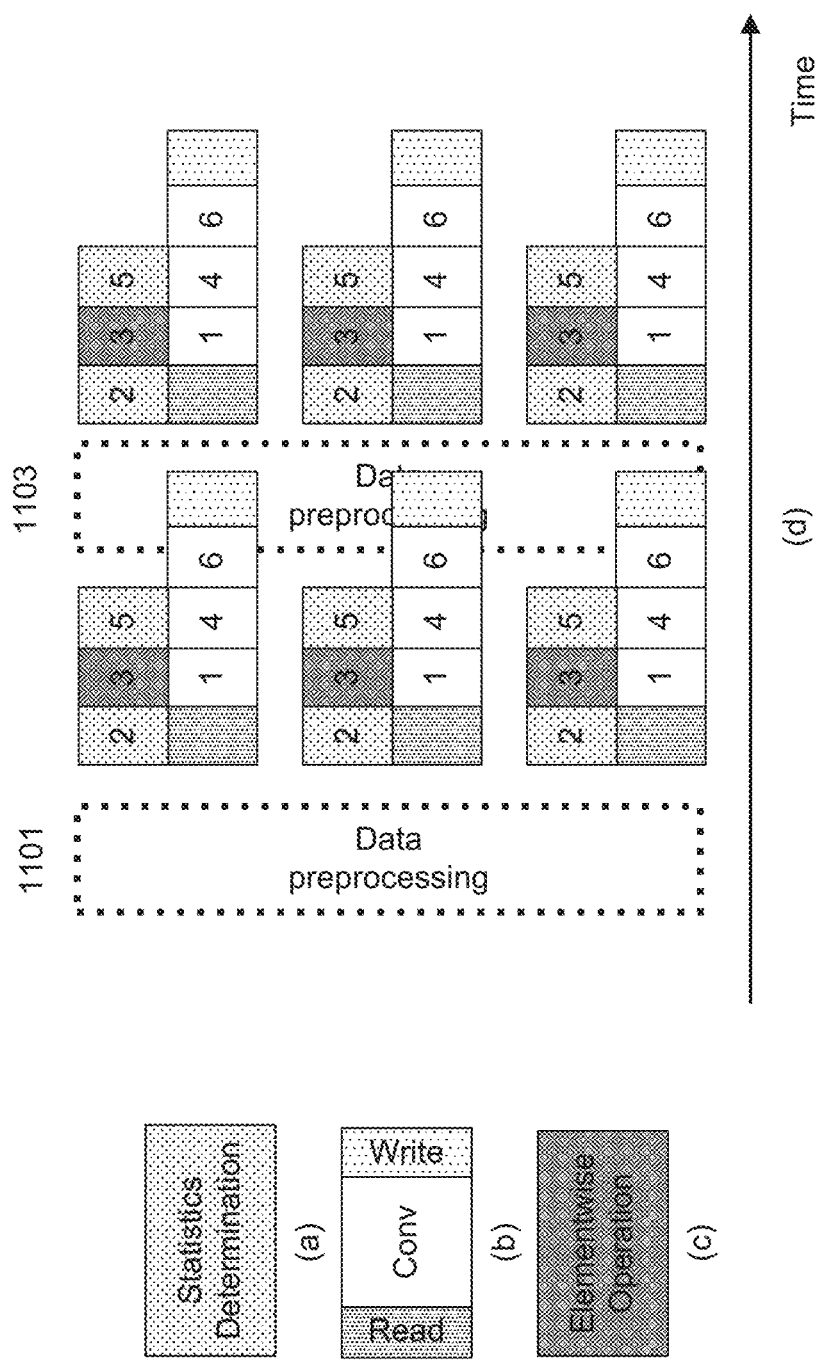
FIG. 11 illustrates a schematic diagram of a seventh exemplary sequence of workloads with data preprocessing, according to some embodiments of the disclosure.

FIG. 11 illustrates a schematic diagram of yet another exemplary sequence of workloads with data preprocessings 1101 and 1103, where neural network processing apparatus 600 in FIG. 6 performs computational graph 200 in FIG. 2, according to some embodiments of the disclosure. Boxes or blocks in FIG. 11 represent similar tasks or operations to those of FIG. 3, FIG. 5, and FIGS. 7-10, as shown in parts (a)-(c) of FIG. 11. As shown at part (d) of FIG. 11, for each of six independent sequences of workloads, tasks 2, 3 and 5 can run in parallel with tasks 1, 4 and 6. Data preprocessing 1103 may be performed during the computation graph 200 and in parallel with tasks in left column of sequences of workloads.

Figure 12:
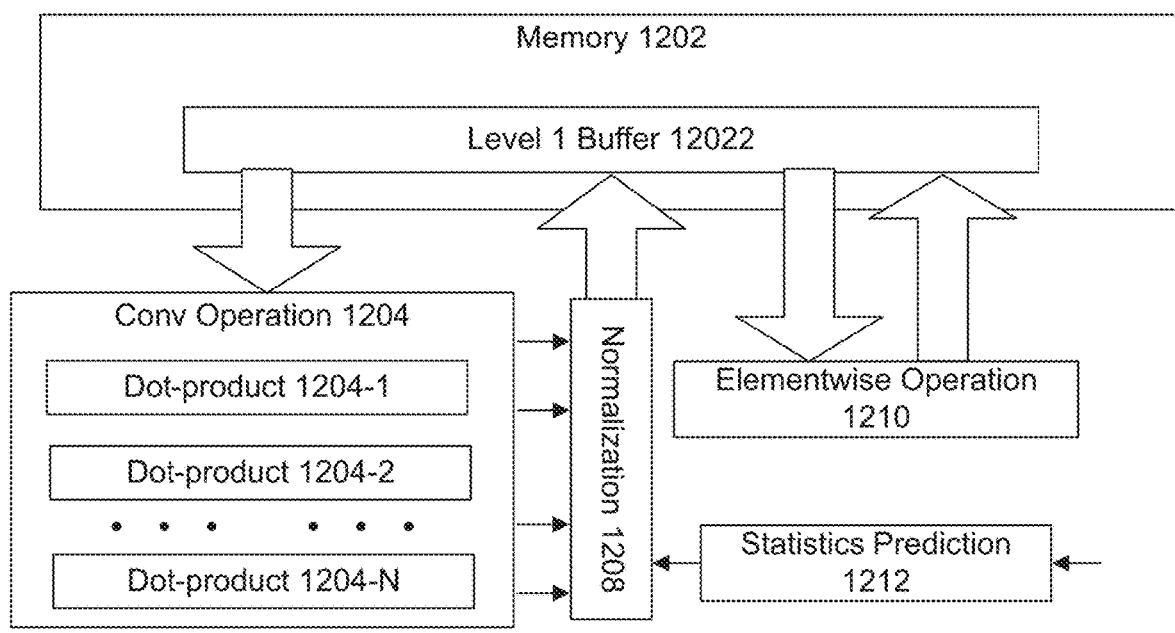
FIG. 12 illustrates a schematic diagram of a third exemplary neural network processing apparatus, according to some embodiments of the disclosure.

FIG. 12 illustrates a schematic diagram of an exemplary neural network processing apparatus 1200, according to some embodiments of the disclosure. In some embodiments, neural network processing apparatus 1200 can be embodied in neural network processing architecture 100 in FIG. 1A or cloud system 140 in FIG. 1B.

As shown in FIG. 12, neural network processing apparatus 1200 can include a memory 1202, a convolution operation unit 1204, a normalization unit 1208, an elementwise operation unit 1210, and a statistics prediction unit 1212.

Memory 1202 can store batch data (e.g., bathes of tensors) and instructions. For example, memory 1202 can have on-chip and off-chip memory blocks to serve as main memory. For example, memory 1202 can be implemented as memory hierarchy 104 in FIG. 1. In some embodiment, memory 1202 can be a buffer hierarchy. As shown in FIG. 12, memory 1202 can include a Level 1 buffer 12022 which can provide high-speed access to data and instructions stored therein to other components. For example, Level 1 buffer 12022 can be communicatively coupled to convolution operation unit 1204, normalization unit 1208 and elementwise operation unit 1210, and temporarily buffer input or output data for these operation units. Therefore, these operation units do not need to read data from or write data to main memory which provides a relatively low-speed access to data and instructions stored therein.

Convolution operation unit 1204 can perform convolution on input data (e.g., a batch of input tensors). For example, as shown in FIG. 12, convolution operation unit 1204 can include a plurality of dot-product operation elements 1204-1, 1204-2, ... , 1204-N. Convolution operation unit 1204 can be communicatively coupled to Level 1 buffer 12022. Therefore, Level 1 buffer 6022 can buffer input data for convolution operation unit 1204. It is appreciated that, convolution operation unit 1204 in FIG. 12 is shown merely as an example, other types of operation units which perform different operations can also be used in the neural network processing apparatus 1200.

Statistics prediction unit 1212 can predict statistics based on previous data. For example, statistics prediction unit 1212 can predict a mean and a variance or a standard deviation based on tensors from previous batches. As an input, statistics prediction unit 1212 can receive previous data, e.g., a last batch of tensors, result of a data preprocessing, and the like.

Normalization unit 1208 can be communicatively coupled to convolution operation unit 1204, Level 1 buffer 6022, and statistics prediction unit 1212. Normalization unit 1208 can receive statistics output from statistics prediction unit 1212 and a result of convolution from convolution operation unit 1204, and normalize the result of convolution using the statistics. For example, normalization unit 1208 can normalize a batch of tensors from convolution operation unit 1204 using a means and a variance received from statistics prediction unit 1212. In addition, normalization unit 1208 can also transform (e.g., scale and shift) the normalized data using a scale and a bias. Then, Level 1 buffer 12022 can buffer the output of normalization unit 1208.

In some embodiments, normalization unit 1208 can be merged with an activation function unit (not shown), and perform an activation function. Activation function includes Binary Step Function, Linear Function, Sigmoid function, Tanh function, ReLU function, Leaky ReLU function, Softmax function, and the like. For example, normalization unit 1208 can also perform a ReLu function.

Elementwise operation unit 1210 can be communicatively coupled to Level 1 buffer 12022, perform an elementwise operation, such as addition, on received data therefrom. Level 1 buffer 12022 can buffer input and output data for elementwise operation unit 1210. While FIG. 12 illustrates unit 1210 as an elementwise operation unit, it is appreciated that elementwise operation unit is merely an example, and any other type of operation unit can be implemented in the neural network processing apparatus 1200.

Figure 13:
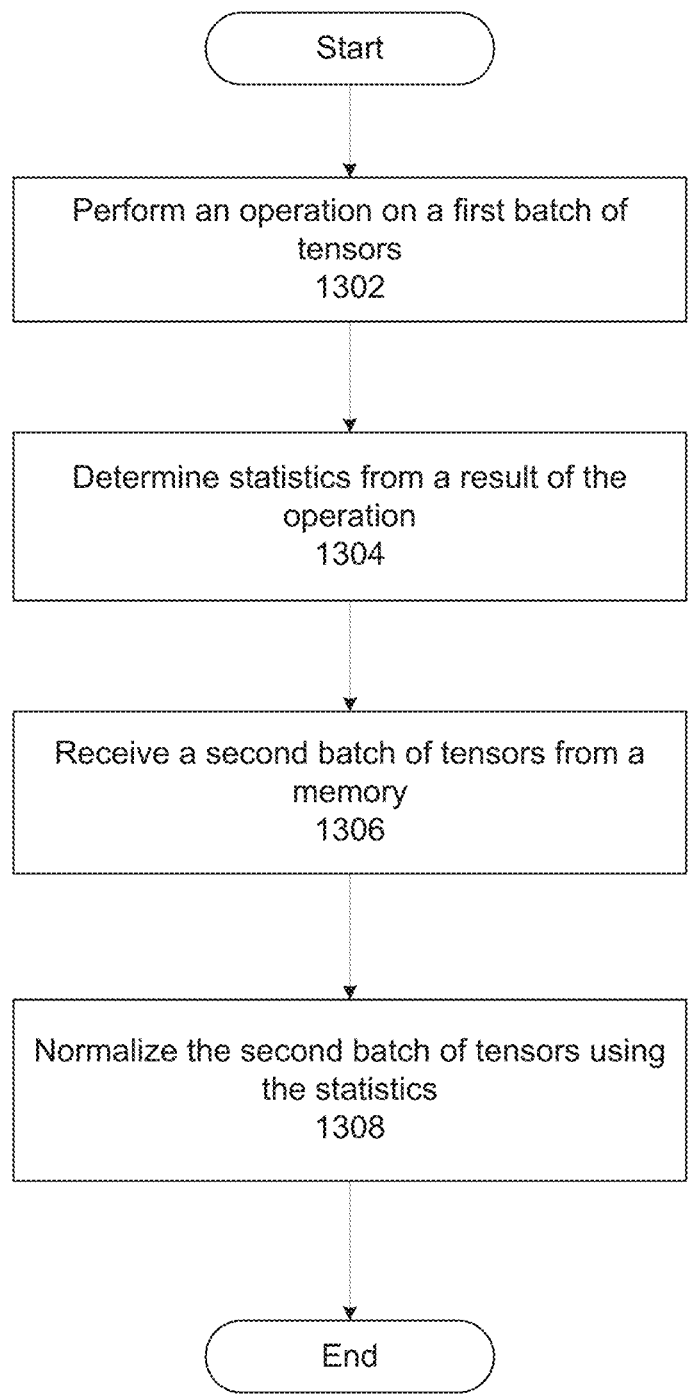
FIG. 13 is a process flow chart of an exemplary neural network processing method, according to some embodiments of the present disclosure.

FIG. 13 is a process flow chart of an exemplary neural network processing method 1300, according to some embodiments of the present disclosure. In some embodiments, neural network processing method 1300 can be implemented by neural network processing apparatus 400 in FIG. 4 or neural network processing apparatus 600 in FIG. 6. In some embodiments, neural network processing method 1300 can be implemented by a computer program product, embodied in a computer-readable medium, including computer-executable instructions, such as program code, executed by computers, such as the systems or architectures as shown in FIG. 1A, FIG. 1B and neural network processing apparatuses in FIGS. 4 and 6.

At step 1302, an operation is performed on a first batch of tensors. The operation can be any suitable type of operation, such as convolution, elementwise operation, and the like. For example, convolution operation unit 404 in FIG. 4 or convolution operation unit 604 in FIG. 6 can perform a convolution operation (e.g., a plurality of dot-product operations) on a batch of tensors.

At step 1304, statistics are determined from a result of the operation. Statistics can be a mean and variance or standard deviation of a batch of tensors. For example, statistics determination unit 406 in FIG. 4 or statistics determination unit 606 in FIG. 6 can receive the output from convolution operation unit 404 or convolution operation unit 604, respectively, and determine statistics for a batch of tensors based on the output.

In some embodiments, neural network processing method 1300 can also include predicting the statistics based on data from a previous batch of tensors and multiplexing between the determined statistics and the predicted statistics. For example, statistics predication unit 612 in FIG. 6 can predict the statistics based on data from a previous batch of tensors, and multiplexer 614 can multiplex between the determined statistics from statistics determination unit 606 and the predicted statistics from statistics predication unit 612.

At step 1306, a second batch of tensors is received from a memory. The memory can be memory 402 in FIG. 4 or memory 602 in FIG. 6. For example, normalization unit 408 in FIG. 4 or normalization unit 608 in FIG. 6 can receive a batch of tensors from memory 402 or memory 602, respectively.

At step 1308, the received second batch of tensors is normalized using the statistics. For example, normalization unit 408 in FIG. 4 or normalization unit 608 in FIG. 6 can normalize the batch of tensors received from memory 402 or memory 602, respectively.

In some embodiments, neural network processing method 1300 can also include transforming the normalized second batch of tensors using a scale and a bias and performing an activation function on the transformed second batch of tensors. These steps can be implemented by normalization unit 408 in FIG. 4 or normalization unit 608 in FIG. 6.

In some embodiments, neural network processing method 1300 can also performing a convolution operation or an elementwise operation on the normalized second batch of tensors. For example, convolution operation unit 404 in FIG. 4 or convolution operation unit 604 in FIG. 6 can perform a convolution operation (e.g., a plurality of dot-product operations) on normalized batch of tensors from normalization 408-1 in FIG. 4 or normalization 608-1 in FIG. 6, respectively. Elementwise operation unit 410 in FIG. 4 or elementwise operation unit 610 in FIG. 6 can perform an elementwise operation (e.g., addition) on normalized batch of tensors from normalization 408-2 in FIG. 4 or normalization 608-2 in FIG. 6, respectively.

Figure 14:
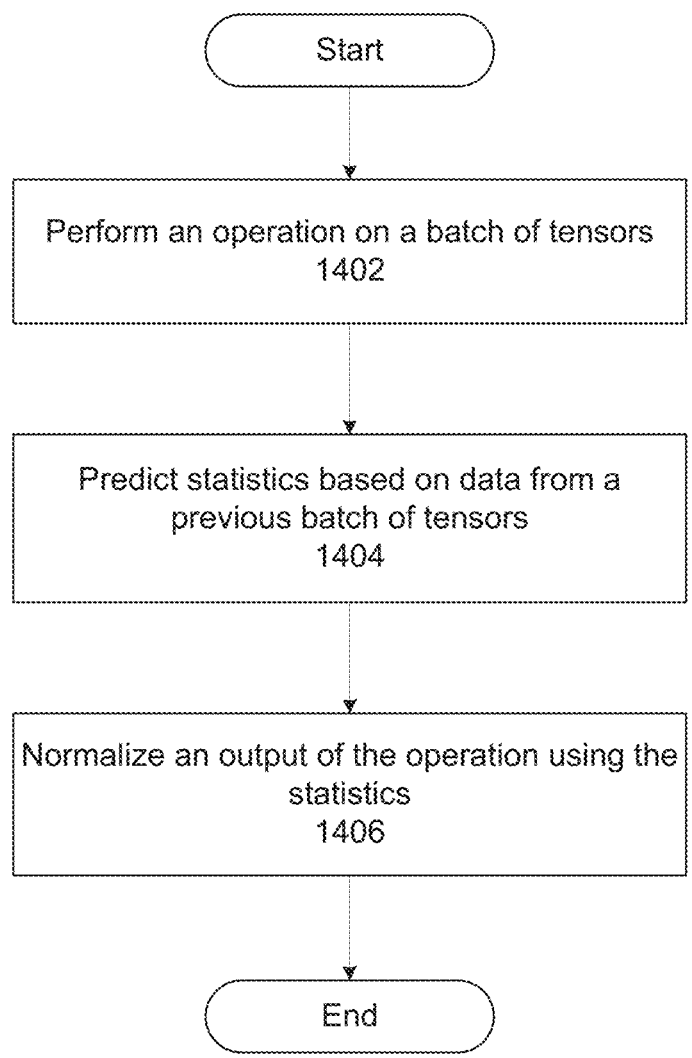
FIG. 14 is a process flow chart of another exemplary neural network processing method, according to some embodiments of the present disclosure.

FIG. 14 is a process flow chart of another exemplary neural network processing method 1400, according to some embodiments of the present disclosure. In some embodiments, neural network processing method 1400 can be implemented by neural network processing apparatus 600 in FIG. 6 or neural network processing apparatus 1200 in FIG. 12. In some embodiments, neural network processing method 1400 can be implemented by a computer program product, embodied in a computer-readable medium, including computer-executable instructions, such as program code, executed by computers, such as the systems or architectures as shown in FIG. 1A, FIG. 1B and neural network processing apparatuses in FIGS. 6 and 12.

At step 1402, an operation is performed on a batch of tensors. The operation can be any suitable type of operation, such as convolution, elementwise operation, and the like. For example, convolution operation unit 604 in FIG. 6 or convolution operation unit 1204 in FIG. 12 can perform a convolution operation (e.g., a plurality of dot-product operations) on a batch of tensors.

At step 1404, statistics are predicted based on data from a previous batch of tensors. For example, statistics predication unit 612 in FIG. 6 or statistics predication unit 1212 in FIG. 12 can predict the statistics based on data from a previous batch of tensors.

At step 1406, an output of the operation is normalized using the statistics. For example, normalization unit 608 in FIG. 6 can normalize the output of convolution operation unit 604 stored or buffered in memory 602. Normalization unit 1208 in FIG. 12 can normalize the output of convolution operation unit 1204.

In some embodiments, neural network processing method 1400 can also include transforming the normalized output using a scale and a bias and performing an activation function on the transformed output. These steps can be implemented by normalization unit 608 in FIG. 6 or normalization unit 1208 in FIG. 12.

In some embodiments, neural network processing method 1400 can also perform a convolution operation or an elementwise operation on the normalized output. For example, convolution operation unit 604 in FIG. 6 or convolution operation unit 1204 in FIG. 12 can perform a convolution operation (e.g., a plurality of dot-product operations) on normalized output from normalization 808-1 in FIG. 8 or normalization 1208 in FIG. 12, respectively. Elementwise operation unit 610 in FIG. 6 or elementwise operation unit 1210 in FIG. 12 can perform an elementwise operation (e.g., addition) on normalized output from normalization 608-2 in FIG. 6 or normalization 1208 in FIG. 12, respectively.

Embodiments of the disclosure can bring many technical advantages. For example, some embodiments of the disclosure can streamline a sequence of training workloads and reduce the frequency of or even remove reading or writing of data. This can reduce a throughput bottleneck for neural network training.

Some embodiments of the disclosure can predict statistics for data normalization. This can remove the need of frequently determining statistics from a batch of samples, and relax dependency of FP/BP on a training sample from FP/BP on another sample. In addition, these embodiments of the disclosure can perform FP/BP with one sample instead of a full batch of training samples because there is no need to wait for calculating statistics for batch normalization from the full batch of training samples. This can reduce memory footprint, which enables more operations to be easily fused together and easier caching results between different layers.

The embodiments of the disclosure can be applied to many products, environments, and scenarios. For example, some embodiments of the disclosure can be applied to Ali-NPU, Ali-Cloud Ali-DPU (Database Acceleration Unit), Ali-AI platform, GPU, TPU, or the like.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments may further be described using the following clauses:

1. A neural network processing apparatus, comprising:
a memory for storing data;
an operation unit to perform an operation on a first batch of tensors;
a statistics determination unit communicatively coupled to the operation unit and configured to receive an output from the operation unit and determine statistics from the output; and
a normalization unit communicatively coupled to the memory and the statistics determination unit and configured to receive a second batch of tensors from the memory and the statistics from the statistics determination unit and to normalize the second batch of tensors using the statistics.

2. The apparatus of clause 1, wherein the statistics comprises a mean and a variance or a standard deviation.

3. The apparatus of clause 1 or clause 2, wherein the normalization unit is configured to transform the normalized second batch of tensors using a scale and a bias.

4. The apparatus of any of clauses 1-3, wherein the normalization unit is configured to perform an activation function.

5. The apparatus of any of clauses 1-4, wherein the operation unit is a convolution operation unit and communicatively coupled to the normalization unit and is configured to perform a convolution operation on an output from the normalization unit.

6. The apparatus of clause 5, further comprising:
a second normalization unit communicatively coupled to the memory and the statistics determination unit and configured to receive a third batch of tensors from the memory and the statistics from the statistics determination unit and to normalize the third batch of tensors using the statistics; and
an elementwise operation unit communicatively coupled to the second normalization unit and configured to perform an elementwise operation on an output of the second normalization unit.

7. The apparatus of any of clauses 1-6, further comprising:
a statistics prediction unit to predict statistics based on data from a previous batch of tensors; and
a multiplexer communicatively coupled to the statistics determination unit, the statistics prediction unit, and the normalization unit, the multiplexer being configured to multiplex outputs from the statistics determination unit and the statistics prediction unit.

8. The apparatus of clause 7, wherein the statistics prediction unit is configured to receive preprocessed data from or configured by a processing unit.

9. The apparatus of any of clauses 1-8, wherein the memory comprises a Level 1 buffer.

10. A neural network processing apparatus, comprising:
a memory for storing data;
an operation unit to perform an operation on a first batch of tensors;
a statistics prediction unit to predict statistics based on data from a previous batch of tensors; and
a normalization unit communicatively coupled to the memory, the statistics prediction unit, and the operation unit, the normalization unit being configured to receive an output of the operation unit and the statistics from the statistics prediction unit, and to normalize the output of the operation unit using the statistics.

11. The apparatus of clause 10, wherein the normalization unit is configured to transform the normalized output of the operation unit using a scale and a bias.

12. The apparatus of clause 10 or clause 11, wherein the normalization unit is configured to perform an activation function.

13. The apparatus of any of clauses 10-12, wherein the operation unit is a convolution unit and communicatively coupled to the memory and is configured to perform a convolution operation on the batch of tensors from the memory.

14. The apparatus of any of clauses 10-13, further comprising:
an elementwise operation unit communicatively coupled to the memory and configured to perform an elementwise operation on a second batch of tensors from the memory.

15. The apparatus of any of clauses 10-14, wherein the memory comprises a Level 1 buffer.

16. The apparatus of any of clauses 10-15, wherein the statistics prediction unit is configured to receive preprocessed data from or configured by a processing unit.

17. The apparatus of any of clauses 10-16, wherein the statistics comprises a mean and a variance or a standard deviation.

18. A neural network processing method, comprising:
performing an operation on a first batch of tensors;
determining statistics from a result of the operation;
receiving a second batch of tensors from a memory; and
normalizing the second batch of tensors using the statistics.

19. The method of clause 18, wherein the statistics comprises a mean and a variance or a standard deviation.

20. The method of clause 18 or clause 19, further comprising:
predicting the statistics based on data from a previous batch of tensors; and
multiplexing between the determined statistics and the predicted statistics.

21. The method of any of clauses 18-20, further comprising:
transforming the normalized second batch of tensors using a scale and a bias; and
performing an activation function on the transformed second batch of tensors.

22. The method of any of clauses 18-21, further comprising:
performing a convolution operation or an elementwise operation on the normalized second batch of tensors.

23. The method of any of clauses 18-22, wherein the operation is a convolution operation.

24. A neural network processing method, comprising:
performing an operation on a batch of tensors;
predicting statistics based on data from a previous batch of tensors; and
normalizing an output of the operation using the statistics.

25. The method of clause 24, further comprising:
transforming the normalized output using a scale and a bias; and
performing an activation function on the transformed output.

26. The method of clause 24 or clause 25, further comprising:
performing a convolution operation or an elementwise operation on the normalized output.

27. The method of any of clauses 24-26, wherein the statistics comprises a mean and a variance or a standard deviation.

28. The method of any of clauses 24-274, wherein the operation is a convolution operation.

29. A terminal, comprising:
a host unit; and
one or more heterogeneous computation units (HCUs) communicatively coupled with the host unit, each HCU comprising:
a memory for storing data;
an operation unit to perform an operation on a first batch of tensors;
a statistics determination unit communicatively coupled to the operation unit and configured to receive an output from the operation unit and determine statistics from the output; and
a normalization unit communicatively coupled to the memory and the statistics determination unit and configured to receive a second batch of tensors from the memory and the statistics from the statistics determination unit and to normalize the second batch of tensors using the statistics.

30. A terminal, comprising:
a host unit; and
one or more heterogeneous computation units (HCUs) communicatively coupled with the host unit, each HCU comprising:
  a memory for storing data;
  an operation unit to perform an operation on a first batch of tensors;
  a statistics prediction unit to predict statistics based on data from a previous batch of tensors; and
  a normalization unit communicatively coupled to the memory, the statistics prediction unit, and the operation unit, the normalization unit being configured to receive an output of the operation unit and the statistics from the statistics prediction unit, and to normalize the output of the operation unit using the statistics.

In the foregoing specification, embodiments have been described with reference to numerous specific details that may vary from implementation to implementation. Certain adaptations and modifications of the described embodiments may be made. Other embodiments may be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art may appreciate that these steps may be performed in a different order while implementing the same method.

In the drawings and specification, there have been disclosed exemplary embodiments. However, many variations and modifications may be made to these embodiments. Accordingly, although specific terms are employed, they are used in a generic and descriptive sense only and not for purposes of limitation, the scope of the embodiments being defined by the following claims.

The invention claimed is:

1. A neural network processing apparatus, comprising:
   a memory for storing data;
   an operation unit to perform an operation on a first batch of tensors;
   a statistics determination unit communicatively coupled to the operation unit and configured to receive an output from the operation unit and determine statistics from the output; and
   a normalization unit communicatively coupled to the memory and the statistics determination unit and configured to receive a second batch of tensors from the memory and the statistics from the statistics determination unit and to normalize the second batch of tensors using the statistics.

2. The apparatus of claim 1, wherein the normalization unit is configured to transform the normalized second batch of tensors using a scale and a bias.

3. The apparatus of claim 1, wherein the normalization unit is configured to perform an activation function.

4. The apparatus of claim 1, wherein the operation unit is a convolution operation unit and communicatively coupled to the normalization unit and is configured to perform a convolution operation on an output from the normalization unit.

5. The apparatus of claim 4, further comprising:
   a second normalization unit communicatively coupled to the memory and the statistics determination unit and configured to receive a third batch of tensors from the memory and the statistics from the statistics determination unit and to normalize the third batch of tensors using the statistics; and
   an elementwise operation unit communicatively coupled to the second normalization unit and configured to perform an elementwise operation on an output of the second normalization unit.

6. The apparatus of claim 1, wherein the memory comprises a Level 1 buffer.

7. The apparatus of claim 1, further comprising:
   a statistics prediction unit communicatively coupled to the normalization unit and configured to predict statistics based on data from a previous batch of tensors.

8. The apparatus of claim 7, further comprising:
   a multiplexer communicatively coupled to the statistics determination unit, the statistics prediction unit, and the normalization unit, the multiplexer being configured to multiplex outputs from the statistics determination unit and the statistics prediction unit.

9. The apparatus of claim 7, wherein the statistics prediction unit is configured to receive preprocessed data from or configured by a processing unit.

10. A neural network processing method, comprising:
    performing an operation on a first batch of tensors;
    determining statistics from a result of the operation;
    receiving a second batch of tensors from a memory; and
    normalizing the second batch of tensors using the statistics.

11. The method of claim 10, further comprising:
    predicting the statistics based on data from a previous batch of tensors; and
    multiplexing between the determined statistics and the predicted statistics.

12. The method of claim 10, further comprising:
    transforming the normalized second batch of tensors using a scale and a bias; and
    performing an activation function on the transformed second batch of tensors.

13. The method of claim 10, further comprising:
    performing a convolution operation or an elementwise operation on the normalized second batch of tensors.

14. The method of claim 10, wherein the operation is a convolution operation.

15. A terminal, comprising:
    a host unit; and
    one or more heterogeneous computation units (HCUs) communicatively coupled with the host unit, each HCU comprising:
      a memory for storing data;
      an operation unit to perform an operation on a first batch of tensors;
      a statistics determination unit communicatively coupled to the operation unit and configured to receive an output from the operation unit and determine statistics from the output; and
      a normalization unit communicatively coupled to the memory and the statistics determination unit and configured to receive a second batch of tensors from the memory and the statistics from the statistics determination unit and to normalize the second batch of tensors using the statistics.

16. The terminal of claim 15, each HCU further comprises:
    a statistics prediction unit communicatively coupled to the normalization unit and configured to predict statistics based on data from a previous batch of tensors.

17. The terminal of claim 16, each HCU further comprises:

a multiplexer communicatively coupled to the statistics determination unit, the statistics prediction unit, and the normalization unit, the multiplexer being configured to multiplex outputs from the statistics determination unit and the statistics prediction unit.

18. The terminal of claim 16, wherein the statistics prediction unit is configured to receive preprocessed data from or configured by the host unit.

19. The terminal of claim 15, wherein the operation unit is a convolution operation unit and communicatively coupled to the normalization unit and is configured to perform a convolution operation on an output from the normalization unit.

20. The terminal of claim 15, each HCU further comprises:

a second normalization unit communicatively coupled to the memory and the statistics determination unit and configured to receive a third batch of tensors from the memory and the statistics from the statistics determination unit and to normalize the third batch of tensors using the statistics; and an elementwise operation unit communicatively coupled to the second normalization unit and configured to perform an elementwise operation on an output of the second normalization unit.

\* \* \* \* \*